United States Patent

Teraoka

(10) Patent No.: US 10,775,595 B2
(45) Date of Patent: Sep. 15, 2020

(54) CAMERA LENS

(71) Applicant: AAC Acoustic Technologies (Shenzhen) Co., Ltd., Shenzhen (CN)

(72) Inventor: Hiroyuki Teraoka, Shenzhen (CN)

(73) Assignee: AAC Communication Technologies (Changzhou) Co., Ltd., Changzhou (CN)

( * ) Notice: Subject to any disclaimer, the term of this patent is extended or adjusted under 35 U.S.C. 154(b) by 90 days.

(21) Appl. No.: 16/236,542

(22) Filed: Dec. 30, 2018

(65) Prior Publication Data

US 2020/0103629 A1   Apr. 2, 2020

(30) Foreign Application Priority Data

Sep. 30, 2018   (JP) .................. 2018-186239

(51) Int. Cl.
   *G02B 9/60*   (2006.01)
   *G02B 13/00*   (2006.01)

(52) U.S. Cl.
   CPC .......... *G02B 13/0045* (2013.01); *G02B 9/60* (2013.01)

(58) Field of Classification Search
   CPC .... G02B 13/0045; G02B 13/18; G02B 13/16; G02B 9/60; G02B 27/0025; G02B 5/208; H04N 5/2254; H04N 5/2253; H04N 5/23209; B23K 26/0648
   See application file for complete search history.

(56) References Cited

U.S. PATENT DOCUMENTS

| | | | |
|---|---|---|---|
| 9,557,535 B1 * | 1/2017 | Liao .................. | G02B 9/60 |
| 10,215,955 B2 * | 2/2019 | Lin .................. | G02B 9/60 |
| 2012/0154929 A1 * | 6/2012 | Tsai .................. | G02B 9/60 359/714 |
| 2015/0268448 A1 * | 9/2015 | Kubota .............. | G02B 27/0025 359/755 |
| 2016/0004042 A1 * | 1/2016 | Kubota .............. | G02B 13/0045 359/713 |
| 2016/0054543 A1 * | 2/2016 | Nabeta .............. | G02B 27/0025 359/713 |
| 2019/0243105 A1 * | 8/2019 | Yan .................. | G02B 9/60 |

* cited by examiner

*Primary Examiner* — William R Alexander
*Assistant Examiner* — Tamara Y. Washington
(74) *Attorney, Agent, or Firm* — IPro, PLLC; Na Xu

(57) ABSTRACT

The present disclosure provides an ultrathin 5-lensed camera lens having excellent optical characteristics, a field of view being greater than 85°, and bright F number. Starting from the object side, configuration of the five lenses is as follows in order: a first lens with positive refractive power, a second lens with positive refractive power, a third lens with negative refractive power, a fourth lens with positive refractive power and a fifth lens with negative refractive power. The lenses meet designated conditional formulas.

3 Claims, 7 Drawing Sheets

CAMERA LENS

CROSS-REFERENCE TO RELATED APPLICATIONS

This application claims the priority benefit of Japanese Patent Applications Ser. No. 2018-186239 filed on Sep. 30, 2018, the entire content of which is incorporated herein by reference.

TECHNICAL FIELD

The present disclosure relates to the field of camera lens, and particularly to a mobile phone camera assembly, a WEB camera lens and the like that use camera elements such as high-pixel CCD or CMOS, which is composed of five lenses with excellent optical characteristics, and of which an F number (hereinafter referred to as Fno) is less than 2.05, a field of view (hereinafter referred to as 2ω) is greater than 85° which is called as a wide angle, TTL (optical length)/IH (image height)≤1.35 which is deemed as ultrathin.

BACKGROUND

In recent years, various types of camera devices that use camera elements such CCD and CMOS are increasingly widely used. As the camera elements are being miniaturized while getting higher-performanced, ultrathin camera lenses with excellent optical characteristics, wide angle and bright Fno are more eagerly demanded.

Technological development associated with the ultrathin 5-lensed camera lens with excellent optical characteristics, wide angle and bright Fno is gradually proceeding. A proposal is that the camera lens is composed of five lenses which, in sequence, starting from an object side, are a first lens with positive refractive power, a second lens with positive refractive power, a third lens with negative refractive power, a fourth lens with positive refractive power and a fifth lens with negative refractive power.

A camera lens disclosed in related technologies is the above-described camera lens composed of five lenses, but a difference between Abbe numbers of the second lens and fourth lens, and of the second lens and fifth lens, a ratio between focal distances of the second lens and fourth lens, and a ratio between center thicknesses of the second lens and first lens are insufficient, and thus the ultrathinization and the Fno brightness are insufficient.

The camera lens disclosed in related technologies is the above-described camera lens composed of five lenses, but the difference between Abbe numbers of the second lens and fourth lens, and a ratio between center thicknesses of the second lens and first lens are insufficient, and thus the ultrathinization and the Fno brightness are insufficient.

DETAILED DESCRIPTION

Figure 1:
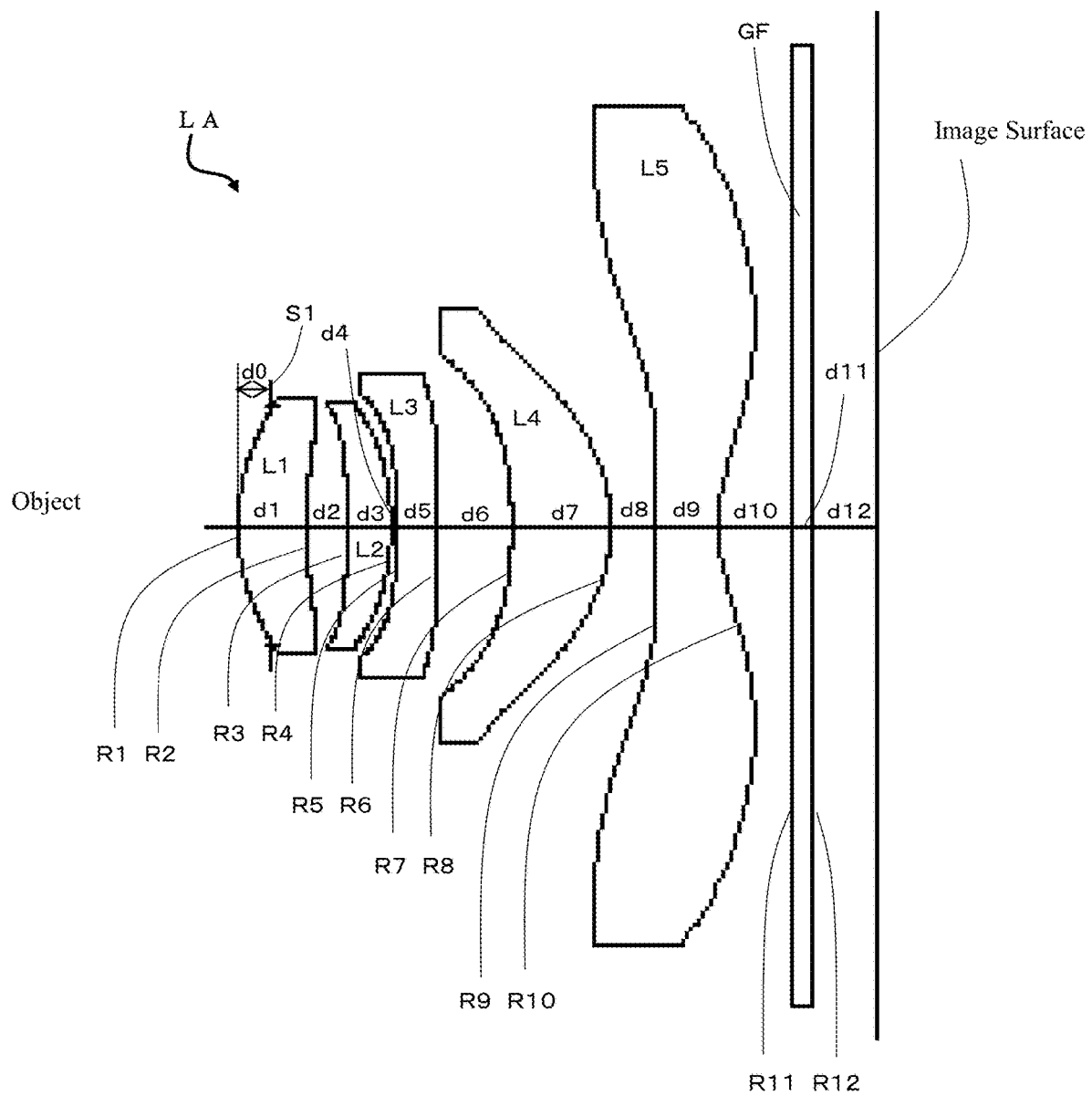
FIG. 1 is a view showing the configuration of a camera lens LA according to an embodiment of the present disclosure.

One embodiment of a camera lens according to the present disclosure is described with reference to the drawings. FIG. 1 is a view showing the configuration of a camera lens according to an embodiment of the present disclosure. A camera lens LA is composed of a group of five lenses, i.e., a first lens L1, a second lens L2, a third lens L3, a fourth lens L4, and a fifth lens L5, which are arranged in this order from an object side to an image side. A glass plate GF is arranged between the fifth lens L5 and an image surface. A glass cover sheet or an optical filter having an IR cut-off function may be used as the glass plate GF. It is also possible not to have a glass plate GF between the fifth lens L5 and the image surface.

The first lens L1 has a positive refractive power, the second lens L2 has a positive refractive power, the third lens L3 has a negative refractive power, the fourth lens L4 has a positive refractive power and the fifth lens has a negative refractive power. In order to solve the aberration problem, preferably, surfaces of the five lenses are designed as aspherical.

The camera lens LA is a camera lens that meets the following formulas (1)-(5):

$$28.00 \leq v2-v3 \leq 40.00 \quad (1);$$

$$28.00 \leq v2-v4 \leq 40.00 \quad (2);$$

$$28.00 \leq v2-v5 \leq 40.00 \quad (3);$$

$$1.80 \leq f2/f4 \leq 2.00 \quad (4);$$

$$0.63 \leq d3/d1 \leq 0.66 \quad (5);$$

wherein,
v2: Abbe number of the second lens;
v3: Abbe number of the third lens;
v4: Abbe number of the fourth lens;
v5: Abbe number of the fifth lens;
f2: focal distance of the second lens;
f4: focal distance of the fourth lens;
d1: center thickness of the first lens;
d3: center thickness of the second lens.

Conditional formula (1) defines a difference between Abbe numbers of the second lens L2 and third lens L3, conditional formula (2) defines a difference between Abbe numbers of the second lens L2 and fourth lens L4, and conditional formula (3) defines a difference between Abbe numbers of the second lens L2 and fifth lens L5.

Beyond the scope of the conditional formulas (1) to (3), it is difficult to correct on-axis and off-axis chromatic aberration in the case of wide angle, ultrathiness and bright Fno.

Conditional formula (4) defines a ratio between the focal distance f2 of the second lens L2 and the focal distance of the fourth lens L4. Beyond the scope of the conditional formula (4), it is difficult to be ultrathinized in the case of wide angle and bright Fno.

Conditional formula (5) defines a ratio between the center thickness d3 of the second lens L2 and the center thickness d1 of the first lens L1. Beyond the scope of the conditional formula (5), it is difficult to be ultrathinized in the case of wide angle and bright Fno.

The second lens L2 has a positive refractive power that meets the following formula (6):

$$2.95 \leq R3/R4 \leq 3.20 \quad (6);$$

wherein,

R3: curvature radius on an object side of the second lens;
R4: curvature radius on an image side of the second lens;

Conditional formula (6) defines a ratio between the curvature radius R3 on the object side of the second lens L2 and the curvature radius R4 on an image side of the second lens L2. Beyond the scope of the conditional formula (6), it is difficult to be ultrathinized in the case of wide angle and bright Fno.

The third lens L3 has a negative refractive power that meets the following formula (7):

$$-2.70 \leq R5/R6 \leq -1.00 \quad (7);$$

wherein,

R5: curvature radius on an object side of the third lens;
R6: curvature radius on an image side of the third lens;

Conditional formula (7) defines a ratio between the curvature radius R5 on the object side of the third lens L3 and the curvature radius R6 on an image side of the third lens L3. Beyond the scope of the conditional formula (7), it is difficult to be ultrathinized in the case of wide angle and bright Fno.

Since the five lenses constituting the camera lens LA meet the above-described configurations and conditional formulas, it is possible to provide an ultrathin camera lens with excellent optical characteristics, a field of view greater than 85°, and bright Fno.

The camera lens LA of the present disclosure will be described below by way of embodiments. Signs described in the embodiments are as follows. Distances, radiuses and center thicknesses are in millimeters.

f: focal distance of the entire camera lens LA;
f1: focal distance of the first lens L1;
f2: focal distance of the second lens L2;
f3: focal distance of the third lens L3;
f4: focal distance of the fourth lens L4;
f5: focal distance of the fifth lens L5;
Fno: F number;
2ω: field of view;
S1: opening aperture;
R: curvature radius of optical surface, or central curvature radius of lens;
R1: curvature radius of object side surface of the first lens L1;
R2: curvature radius of image side surface of the first lens L1;
R3: curvature radius of object side surface of the second lens L2;
R4: curvature radius of image side surface of the second lens L2;
R5: curvature radius of object side surface of the third lens L3;
R6: curvature radius of image side surface of the third lens L3;
R7: curvature radius of object side surface of the fourth lens L4;
R8: curvature radius of image side surface of the fourth lens L4;
R9: curvature radius of object side surface of the fifth lens L5;
R10: curvature radius of image side surface of the fifth lens L5;
R11: curvature radius of object side surface of the glass plate GF;
R12: curvature radius of image side surface of the glass plate GF;
d: center thickness or distance between lens;
d0: distance from opening aperture S1 to the object side of the first lens L1;
d1: center thickness of the first lens L1;
d2: distance from the image side surface of the first lens L1 to the object side surface of the second lens L2;
d3: center thickness of the second lens L2;
d4: on-axis distance from the image side surface of the second lens L2 to the object side surface of the third lens L3;
d5: center thickness of the third lens L3;
d6: on-axis distance from the image side surface of the third lens L3 to the object side surface of the fourth lens L4;
d7: center thickness of the fourth lens L4;
d8: on-axis distance from the image side surface of the fourth lens L4 to the object side surface of the fifth lens L5;
d9: center thickness of the fifth lens L5;
d10: on-axis distance from the image side surface of the fifth lens L5 to the object side surface of the glass plate GF;
d11: center thickness of the glass plate GF;
d12: on-axis distance from the image side of the glass plate GF to the image surface;
nd: refractivity of line d;
nd1: refractivity of the lined of the first lens L1;
nd2: refractivity of the line d of the second lens L2;
nd3: refractivity of the line d of the third lens L3;
nd4: refractivity of the line d of the fourth lens L4;
nd5: refractivity of the line d of the fifth lens L5;
nd6: refractivity of the line d of the glass plate GF;
vd: Abbe number;
v1: Abbe number of the first lens L1;
v2: Abbe number of the second lens L2;
v3: Abbe number of the third lens L3;
v4: Abbe number of the fourth lens L4;
v5: Abbe number of the fifth lens L5;
v6: Abbe number of the glass plate GF;
TTL: optical length (on-axis distance from the object side surface of the first lens L1 to the image surface);
LB: on-axis distance (including the thickness of the glass plate GF) from the image side surface of the fifth lens L5 to the object surface.
IH: image height $$y=(x^2/R)/[1+\{1-(k+1)(x^2/R^2)\}^{1/2}]+A4x^4+A6x^6+A8x^8+ A10x^{10}+A12x^{12}+A14x^{14}+A16x^{16}+A18x^{18}+A20x^{20} \quad (8)$$

wherein R is on-axis curvature radius, k is conic coefficient, and A4, A6, A8, A10, A12, A14, A16, A18 and A20 are aspherical coefficients.

For sake of convenience, the aspherical surface shown in formula (8) is used for the aspherical surface of each lens surface. The present disclosure, however, is not limited to the aspherical polynomial form illustrated by the formula (8).

Embodiment 1

Figure 2:
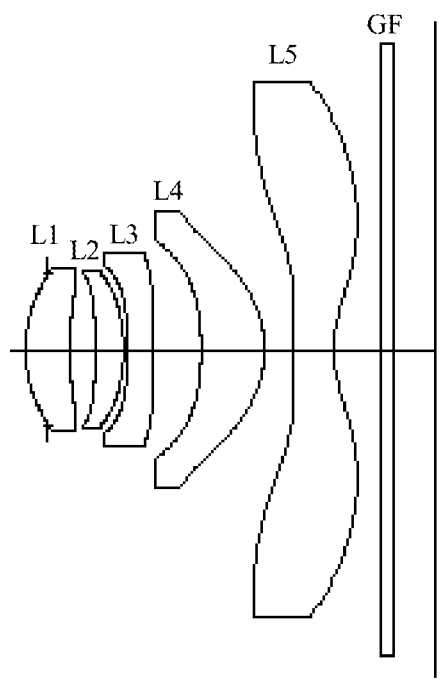
FIG. 2 is a view showing the configuration of a particular embodiment 1 of the above-described camera lens LA.

FIG. 2 is a view showing the configuration of the camera lens LA of embodiment 1. Table 1 contains the following data: the curvature radiuses R of the object side surface and the image side surface of the first lens L1 to the fifth lens L5 constituting the camera lens LA in embodiment 1, the center thickness of the lens, the on-axis distance d between the lenses, the refractivity nd, and the Abbe number vd. Table 2 contains the following data: conic coefficient k, aspherical coefficient.

TABLE 1

|     | R        | d        |        | nd     |    | vd    |
|-----|----------|----------|--------|--------|----|-------|
| S1  | ∞        | d0=      | −0.230 |        |    |       |
| R1  | 1.40228  | d1=      | 0.452  | nd1    | 1.5439 v1 | 55.95 |
| R2  | 3.21903  | d2=      | 0.269  |        |    |       |
| R3  | −5.52497 | d3=      | 0.288  | nd2    | 1.5439 v2 | 55.95 |
| R4  | −1.73723 | d4=      | 0.038  |        |    |       |
| R5  | −7.06455 | d5=      | 0.254  | nd3    | 1.6713 v3 | 19.24 |
| R6  | 5.88839  | d6=      | 0.506  |        |    |       |
| R7  | −2.62252 | d7=      | 0.655  | nd4    | 1.6150 v4 | 25.92 |
| R8  | −1.05931 | d8=      | 0.282  |        |    |       |
| R9  | 3.18353  | d9=      | 0.424  | nd5    | 1.6355 v5 | 23.97 |
| R10 | 0.92875  | d10=     | 0.500  |        |    |       |
| R11 | ∞        | d11=     | 0.110  | nd6    | 1.5168 v6 | 64.17 |
| R12 | ∞        | d12=     | 0.426  |        |    |       |

TABLE 2

|     | Conic Coefficient | Aspherical Coefficient | | | |
|-----|-------------------|------------|------------|------------|------------|
|     | k                 | A4         | A6         | A8         | A10        |
| R1  | 9.2910E−01        | −5.0333E−02 | 8.8880E−02 | −6.8981E−01 | 1.8817E+00 |
| R2  | −4.2715E+00       | 2.2064E−02 | −1.0138E−01 | 4.0311E−02 | −4.0543E−02 |
| R3  | −6.4085E−01       | −5.4873E−02 | −3.5583E−02 | −7.4539E−01 | 2.0757E+00 |
| R4  | −5.9889E+00       | −1.9843E−01 | 8.3166E−02 | −1.3954E−01 | −2.3623E−01 |
| R5  | −1.8357E+00       | −3.5203E−01 | 5.1409E−01 | −2.2298E+00 | 7.2787E+00 |
| R6  | 5.0398E+00        | −2.6539E−01 | 1.8589E−01 | −1.1594E−01 | −1.4784E−01 |
| R7  | 1.6145E+00        | −9.1342E−02 | 4.2788E−01 | −2.7159E+00 | 8.4909E+00 |
| R8  | −8.1270E−01       | −2.6176E−02 | 4.6185E−01 | −1.7083E+00 | 3.3602E+00 |
| R9  | −9.5225E+01       | −2.2426E−01 | 1.0256E−01 | −4.7507E−03 | −1.1858E−02 |
| R10 | −5.6158E+00       | −1.5268E−01 | 9.6583E−02 | −4.5682E−02 | 1.5461E−02 |

|     | Aspherical Coefficient | | | | |
|-----|------------|------------|------------|------------|------------|
|     | A12        | A14        | A16        | A18        | A20        |
| R1  | −3.2204E+00 | 2.9879E+00 | −1.3686E+00 | 0.0000E+00 | 0.0000E+00 |
| R2  | −1.8637E−01 | −2.7437E−01 | 4.8126E−01 | 0.0000E+00 | 0.0000E+00 |
| R3  | −2.6993E+00 | 1.6922E−01 | 1.5022E+00 | 0.0000E+00 | 0.0000E+00 |
| R4  | 6.1172E−02 | 4.6485E−01 | −3.6946E−01 | 0.0000E+00 | 0.0000E+00 |
| R5  | −1.5165E+01 | 1.6120E+01 | −6.7879E+00 | 0.0000E+00 | 0.0000E+00 |
| R6  | 4.3589E−01 | −5.0590E−01 | 2.5710E−01 | 0.0000E+00 | 0.0000E+00 |
| R7  | −1.6461E+01 | 2.0048E+01 | −1.4778E+01 | 5.9792E+00 | −1.0109E+00 |
| R8  | −4.0951E+00 | 3.1161E+00 | −1.4122E+00 | 3.4630E−01 | −3.5329E−02 |
| R9  | 4.9518E−03 | −9.4562E−04 | 9.3434E−05 | −4.2236E−06 | 4.9161E−08 |
| R10 | −3.6033E−03 | 5.5385E−04 | −5.2923E−05 | 2.8203E−06 | −6.3465E−08 |

Table 7 which will be presented later shows the values in embodiments 1 to 3 corresponding to the values of the parameters specified in the conditional formulas (1) to (7).

As shown in Table 7, embodiment 1 meets the conditional formulas (1) to (7).

Figure 3:
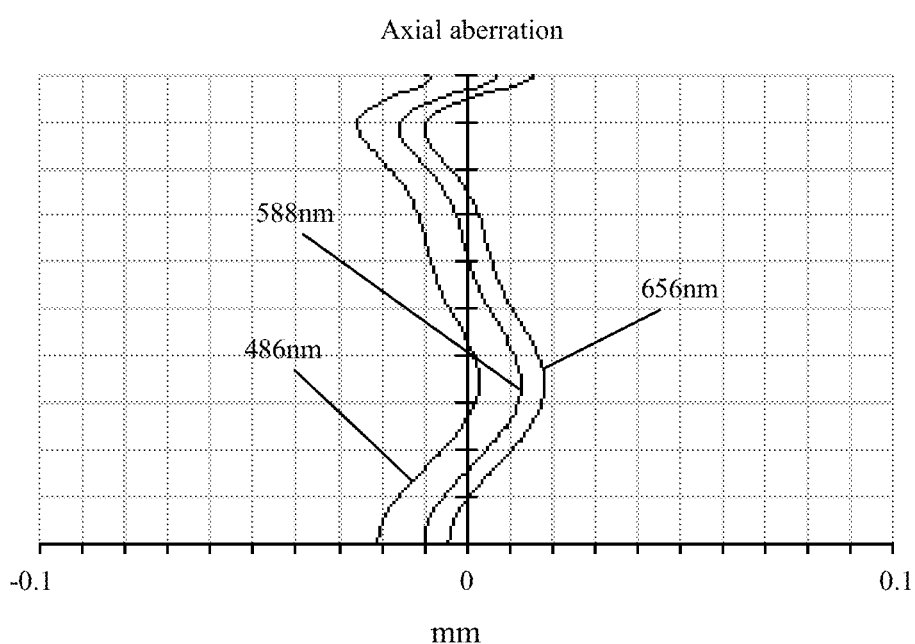
FIG. 3 is a diagram showing an axial aberration of the camera lens LA in the embodiment 1.
Figure 4:
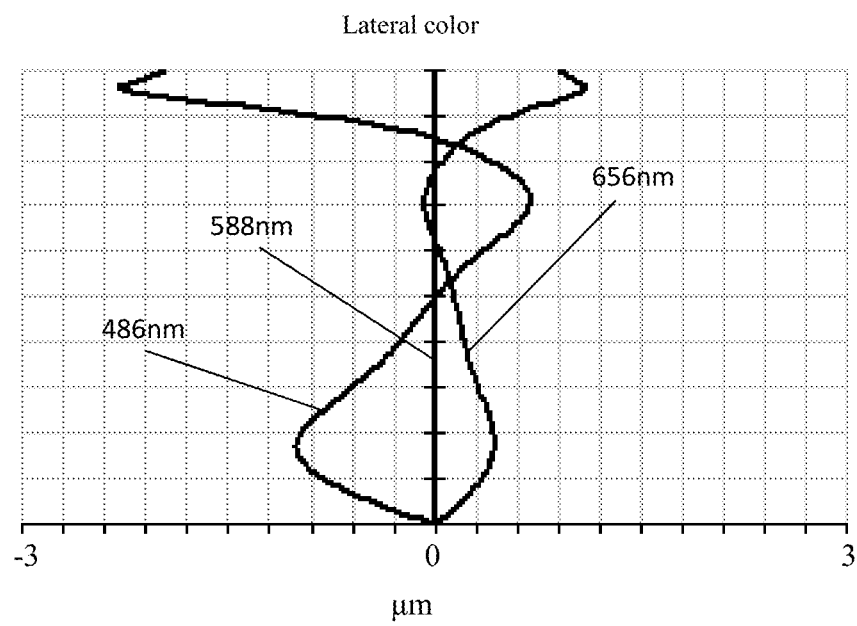
FIG. 4 is a diagram showing lateral color of the camera lens LA in the embodiment 1.
Figure 5:
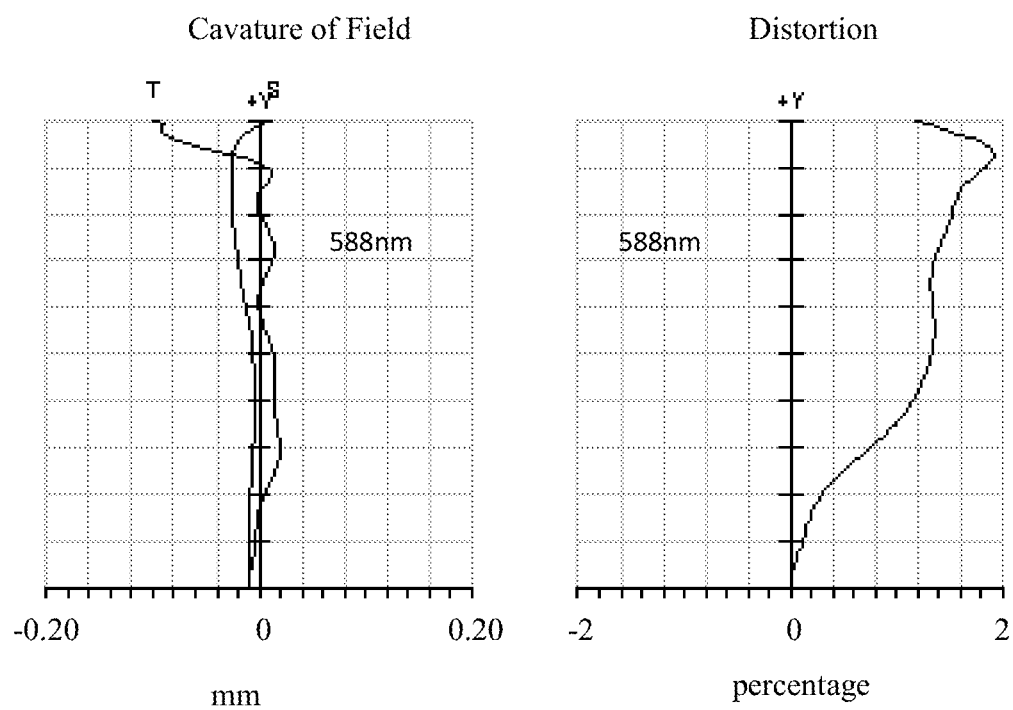
FIG. 5 is a diagram showing field curvature and distortion of the camera lens LA in the embodiment 1.

The axial aberration of the camera lens LA in embodiment 1 is shown in FIG. 3, the lateral color is shown in FIG. 4, and the field curvature and distortion is shown in FIG. 5. Further, field curvature S in FIG. 5 is a field curvature corresponding to a sagittal image surface, and T is a field curvature corresponding to a meridional image surface. The same is true with the embodiments 2 and 3. As shown in FIGS. 3 to 5, in embodiment 1, the camera lens LA meets $2\omega=91.8°$, TTL/IH=1.299, Fno=2.02, $2\omega \geq 85°$, and the camera lens is ultrathing with bright Fno. Accordingly, it is not difficult to understand that the camera lens LA in embodiment 1 has excellent optical characteristics.

Embodiment 2

Figure 6:
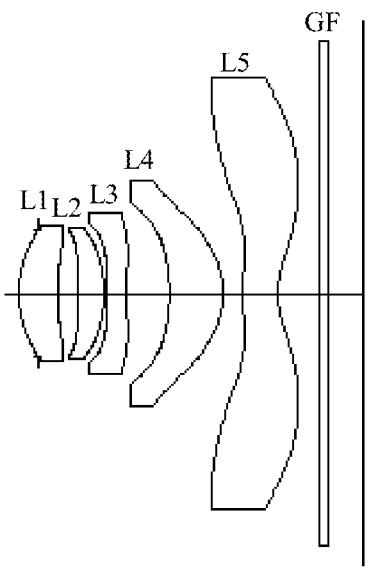
FIG. 6 is a view showing the configuration of a particular embodiment 2 of the above-described camera lens LA.

FIG. 6 is a view showing the configuration of the camera lens LA in embodiment 2. Table 3 contains the following data: the curvature radiuses R of the object side surface and of the image side surface of the first lens L1 to the fifth lens L5 constituting the camera lens LA in embodiment 2, the center thickness of the lens, the on-axis distance d between the lenses, the refractivity nd, and the Abbe number vd. Table 4 contains the following data: conic coefficient k, aspherical coefficient.

TABLE 3

|    | R       | d    |        | nd    |    | vd    |
|----|---------|------|--------|-------|----|-------|
| S1 | ∞       | d0=  | −0.230 |       |    |       |
| R1 | 1.41049 | d1=  | 0.472  | nd1   | 1.5439 v1 | 55.95 |

TABLE 3-continued

| | R | d | | nd | | vd |
|---|---|---|---|---|---|---|
| R2 | 3.13192 | d2= | 0.260 | | | |
| R3 | −5.69465 | d3= | 0.306 | nd2 | 1.5439 v2 | 55.95 |
| R4 | −1.79054 | d4= | 0.038 | | | |
| R5 | −12.71778 | d5= | 0.237 | nd3 | 1.6713 v3 | 19.24 |
| R6 | 4.98742 | d6= | 0.518 | | | |
| R7 | −2.51995 | d7= | 0.653 | nd4 | 1.6150 v4 | 25.92 |
| R8 | −1.05666 | d8= | 0.243 | | | |
| R9 | 2.87664 | d9= | 0.425 | nd5 | 1.6355 v5 | 23.97 |
| R10 | 0.90414 | d10= | 0.500 | | | |
| R11 | ∞ | d11= | 0.110 | nd6 | 1.5168 v6 | 64.17 |
| R12 | ∞ | d12= | 0.439 | | | |

TABLE 4

| | Conic Coefficient | Aspherical Coefficient | | | |
|---|---|---|---|---|---|
| | k | A4 | A6 | A8 | A10 |
| R1 | 9.3220E−01 | −5.1273E−02 | 8.9871E−02 | −6.8927E−01 | 1.8808E+00 |
| R2 | −4.0644E+00 | 2.1126E−02 | −9.6209E−02 | 4.2588E−02 | −4.5253E−02 |
| R3 | 2.1864E−03 | −5.5559E−02 | −3.8248E−02 | −7.5075E−01 | 2.0747E+00 |
| R4 | −5.9063E+00 | −1.9874E−02 | 8.4417E−02 | −1.3621E−01 | −2.3167E−01 |
| R5 | 1.1483E+01 | −3.5240E−01 | 5.1415E−01 | −2.2277E+00 | 7.2827E+00 |
| R6 | 3.0037E+00 | −2.6887E−01 | 1.8423E−01 | −1.1762E−01 | −1.4900E−01 |
| R7 | 1.5517E+00 | −9.0426E−02 | 4.2948E−01 | −2.7155E+00 | 8.4908E+00 |
| R8 | −8.1489E−01 | −2.5566E−02 | 4.6156E−01 | −1.7082E+00 | 3.3603E+00 |
| R9 | −8.0868E+01 | −2.2474E−01 | 1.0260E−01 | −4.7430E−03 | −1.1857E−02 |
| R10 | −5.6106E+00 | −1.5199E−01 | 9.6427E−02 | −4.5689E−02 | 1.5461E−02 |

| | Aspherical Coefficient | | | | |
|---|---|---|---|---|---|
| | A12 | A14 | A16 | A18 | A20 |
| R1 | −3.2210E+00 | 2.9944E+00 | −1.3371E+00 | 0.0000E+00 | 0.0000E+00 |
| R2 | −1.9666E−01 | −2.6005E−01 | 5.5777E−01 | 0.0000E+00 | 0.0000E+00 |
| R3 | −2.6822E+00 | 2.1768E−01 | 1.5693E+00 | 0.0000E+00 | 0.0000E+00 |
| R4 | 6.1693E−02 | 4.7706E−01 | −3.2490E−01 | 0.0000E+00 | 0.0000E+00 |
| R5 | −1.5161E+01 | 1.6119E+01 | −6.7963E+00 | 0.0000E+00 | 0.0000E+00 |
| R6 | 4.3517E−01 | −5.0661E−01 | 2.5605E−01 | 0.0000E+00 | 0.0000E+00 |
| R7 | −1.6461E+01 | 2.0048E+01 | −1.4778E+01 | 5.9793E+00 | −1.0108E+00 |
| R8 | −4.0951E+00 | 3.1161E+00 | −1.4122E+00 | 3.4629E−01 | −3.5333E−02 |
| R9 | 4.9519E−03 | −9.4560E−04 | 9.3435E−05 | −4.2236E−06 | 4.9100E−08 |
| R10 | −3.6032E−03 | 5.5386E−04 | −5.2921E−05 | 2.8204E−06 | −6.3457E−08 |

As shown in Table 7, embodiment 2 meets the conditional formulas (1) to (7).

Figure 7:
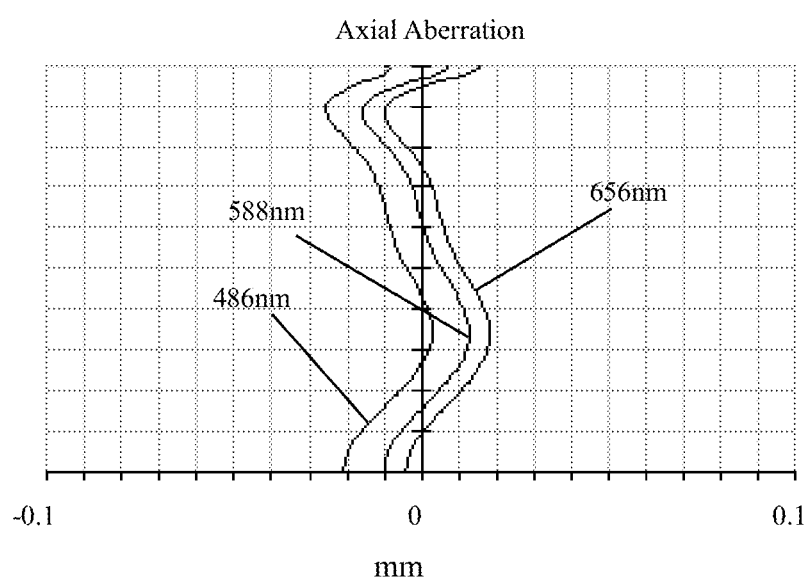
FIG. 7 is a diagram showing an axial aberration of the camera lens LA in the embodiment 2.
Figure 8:
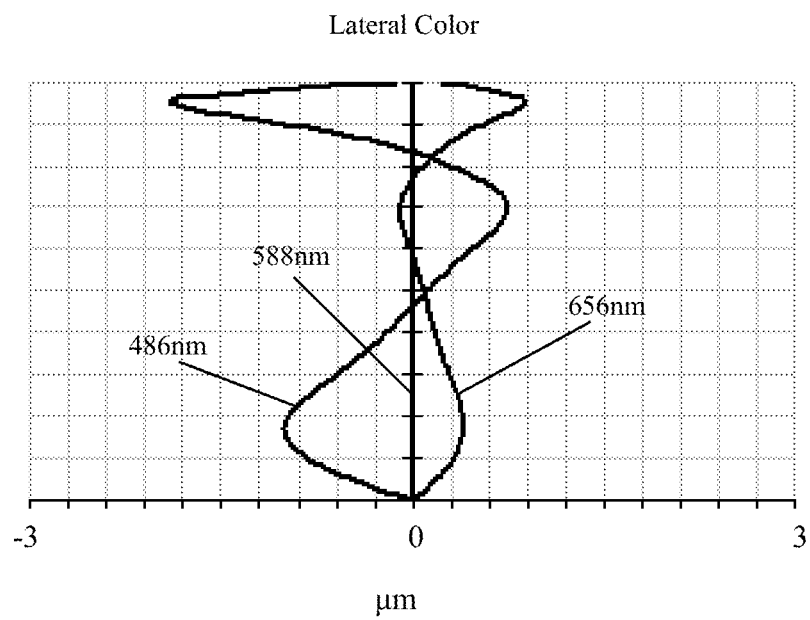
FIG. 8 is a diagram showing lateral color of the camera lens LA in the embodiment 2.
Figure 9:
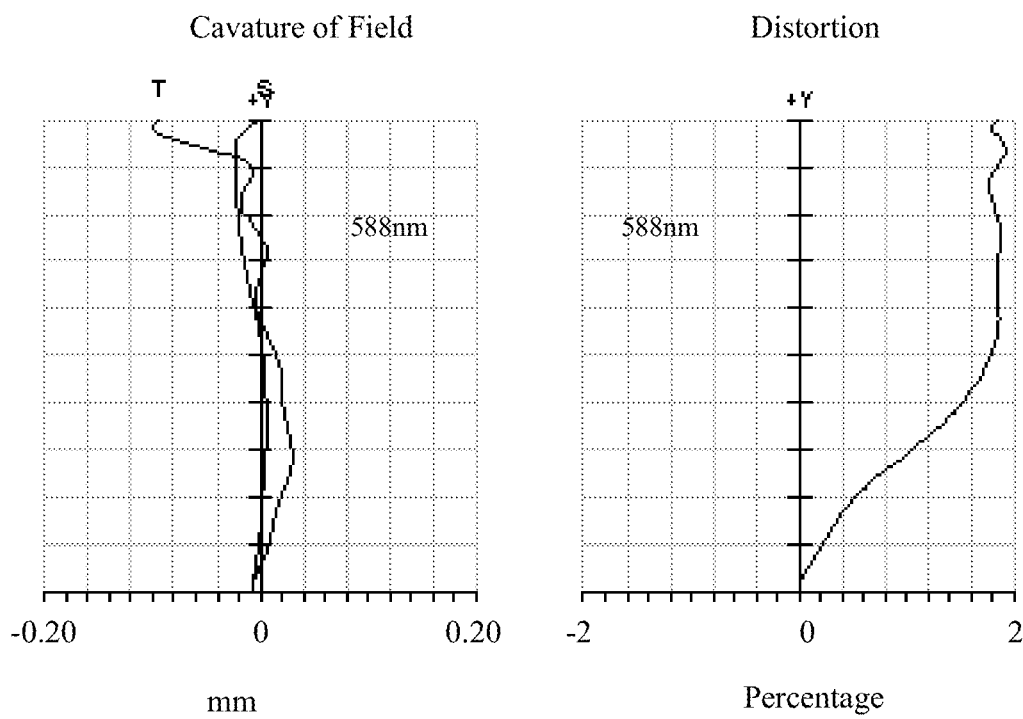
FIG. 9 is a diagram showing field curvature and distortion of the camera lens LA in the embodiment 2.

The axial aberration of the camera lens LA in embodiment 2 is shown in FIG. 7, the lateral color is shown in FIG. 8, and the field curvature and distortion is shown in FIG. 9. As shown in FIGS. 7 to 9, in embodiment 2, the camera lens LA meets $2\omega=91.6°$, TTL/IH=1.298, Fno=2.02, $2\omega \geq 85°$, and the camera lens is ultrathin with bright Fno. Accordingly, it is not difficult to understand that the camera lens LA in embodiment 2 has excellent optical characteristics.

Embodiment 3

Figure 10:
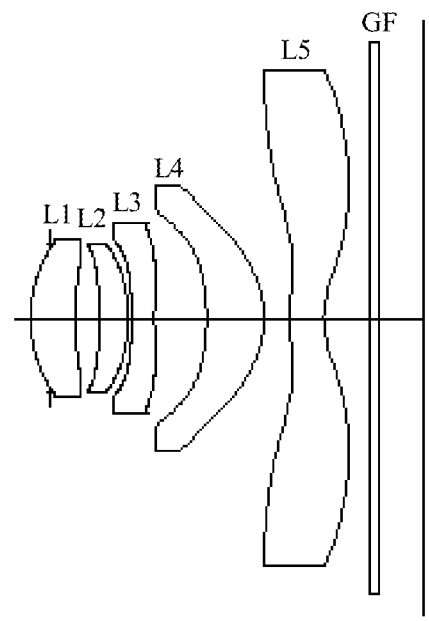
FIG. 10 is a view showing the configuration of a particular embodiment 3 of the above-described camera lens LA.

FIG. 10 is a view showing the configuration of the camera lens LA of embodiment 3. Table 5 contains the following data: the curvature radiuses R of the object side surface and of the image side surface of the first lens L1 to the fifth lens L5 constituting the camera lens LA in embodiment 3, the center thickness of the lens, the on-axis distance d between the lenses, the refractivity nd, and the Abbe number vd. Table 6 contains the following data: conic coefficient k, aspherical coefficient.

TABLE 5

| | R | d | | nd | | vd |
|---|---|---|---|---|---|---|
| S1 | ∞ | d0= | −0.220 | | | |
| R1 | 1.44519 | d1= | 0.482 | nd1 | 1.5439 v1 | 55.95 |
| R2 | 3.22062 | d2= | 0.262 | | | |
| R3 | −5.55434 | d3= | 0.311 | nd2 | 1.5439 v2 | 55.95 |
| R4 | −1.80615 | d4= | 0.038 | | | |

TABLE 5-continued

| | R | d | | nd | | vd |
|---|---|---|---|---|---|---|
| R5 | −10.73945 | d5= | 0.249 | nd3 | 1.6713 v3 | 19.24 |
| R6 | 5.80534 | d6= | 0.563 | | | |
| R7 | −2.49692 | d7= | 0.625 | nd4 | 1.6355 v4 | 23.97 |
| R8 | −1.08242 | d8= | 0.278 | | | |
| R9 | 2.32292 | d9= | 0.368 | nd5 | 1.6447 v5 | 22.48 |
| R10 | 0.84065 | d10= | 0.500 | | | |
| R11 | ∞ | d11= | 0.110 | nd6 | 1.5168 v6 | 64.17 |
| R12 | ∞ | d12= | 0.461 | | | |

TABLE 6

| | Conic Coefficient | Aspherical Coefficient | | | |
|---|---|---|---|---|---|
| | k | A4 | A6 | A8 | A10 |
| R1 | 9.4901E−01 | −5.0604E−02 | 1.1683E−01 | −8.9640E−01 | 2.7037E+00 |
| R2 | −5.2499E+00 | 2.7888E−02 | −3.4938E−01 | 2.9221E+00 | −1.8329E+01 |

TABLE 6-continued

| | | | | | |
|---|---|---|---|---|---|
| R3 | 0.0000E+00 | −7.9280E−02 | 1.9413E−01 | −3.3598E+00 | 1.8210E+01 |
| R4 | −5.1693E+00 | −2.0080E−01 | −1.4182E−02 | 1.2564E+00 | −9.0601E+00 |
| R5 | 0.0000E+00 | −3.3665E−01 | 1.1375E−01 | 1.6509E+00 | −1.1463E+01 |
| R6 | 4.3169E+00 | −2.6152E−01 | 1.7088E−01 | −1.9622E−01 | 4.5686E−01 |
| R7 | 1.7275E+00 | −1.0183E−01 | 4.3498E−01 | −2.7227E+00 | 8.4830E+00 |
| R8 | −8.2523E−01 | −2.7269E−02 | 4.5967E−01 | −1.7098E+00 | 3.3600E+00 |
| R9 | −4.9192E+01 | −2.1832E−01 | 1.0196E−01 | −4.8115E−03 | −1.1861E−02 |
| R10 | −5.3790E+00 | −1.5162E−01 | 9.7196E−02 | −4.5700E−02 | 1.5456E−02 |

| Aspherical Coefficient | | | | | |
|---|---|---|---|---|---|
| | A12 | A14 | A16 | A18 | A20 |
| R1 | −4.8252E+00 | 3.9036E+00 | 4.6561E−01 | −3.0377E+00 | 1.3473E+00 |
| R2 | 6.9657E+01 | −1.6643E+02 | 2.4215E+02 | −1.9615E+02 | 6.8021E+01 |
| R3 | −6.0777E+01 | 1.2711E+02 | −1.6409E+02 | 1.1904E+02 | −3.6056E+01 |
| R4 | 3.2108E+01 | −6.8246E+01 | 8.5761E+01 | −5.8368E+01 | 1.6772E+01 |
| R5 | 3.7196E+01 | −7.1174E+01 | 7.7851E+01 | −4.3389E+01 | 9.1374E+00 |
| R6 | −1.6496E+00 | 3.2879E+00 | −3.5834E+00 | 2.0424E+00 | −4.4001E−01 |
| R7 | −1.6464E+01 | 2.0050E+01 | −1.4774E+01 | 5.9806E+00 | −1.0121E+00 |
| R8 | −4.0952E+00 | 3.1163E+00 | −1.4121E+00 | 3.4634E−01 | −3.5365E−02 |
| R9 | 4.9523E−03 | −9.4543E−04 | 9.3477E−05 | −4.2213E−06 | 4.7221E−08 |
| R10 | −3.6036E−03 | 5.5387E−04 | −5.2916E−05 | 2.8207E−06 | −6.3565E−08 |

As shown in Table 7, embodiment 3 meets the conditional formulas (1) to (7).

Figure 11:
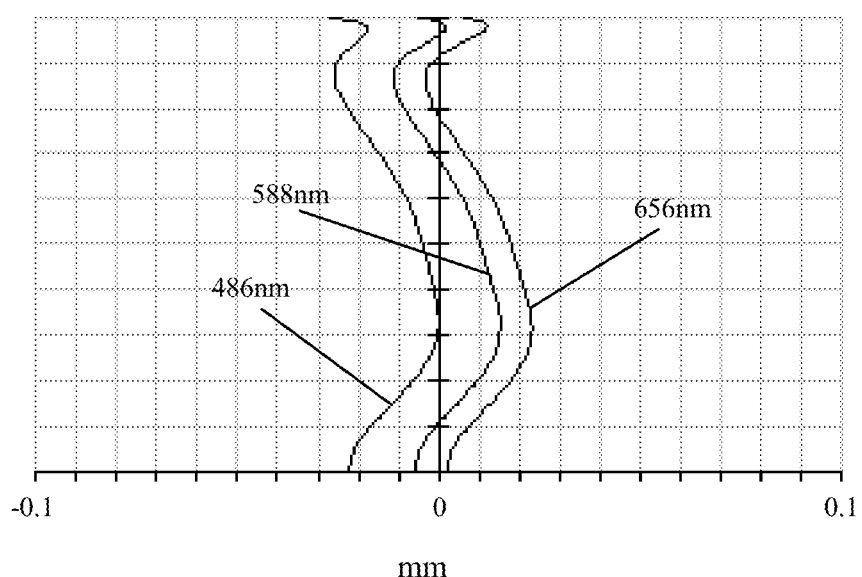
FIG. 11 is a diagram showing an axial aberration of the camera lens LA in the embodiment 3.
Figure 12:
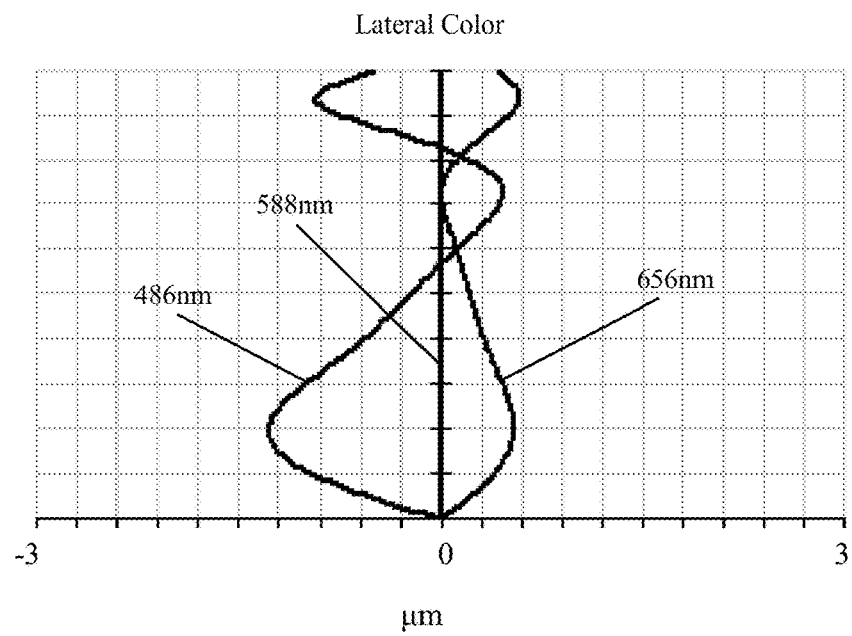
FIG. 12 is a diagram showing lateral color of the camera lens LA in the embodiment 3.
Figure 13:
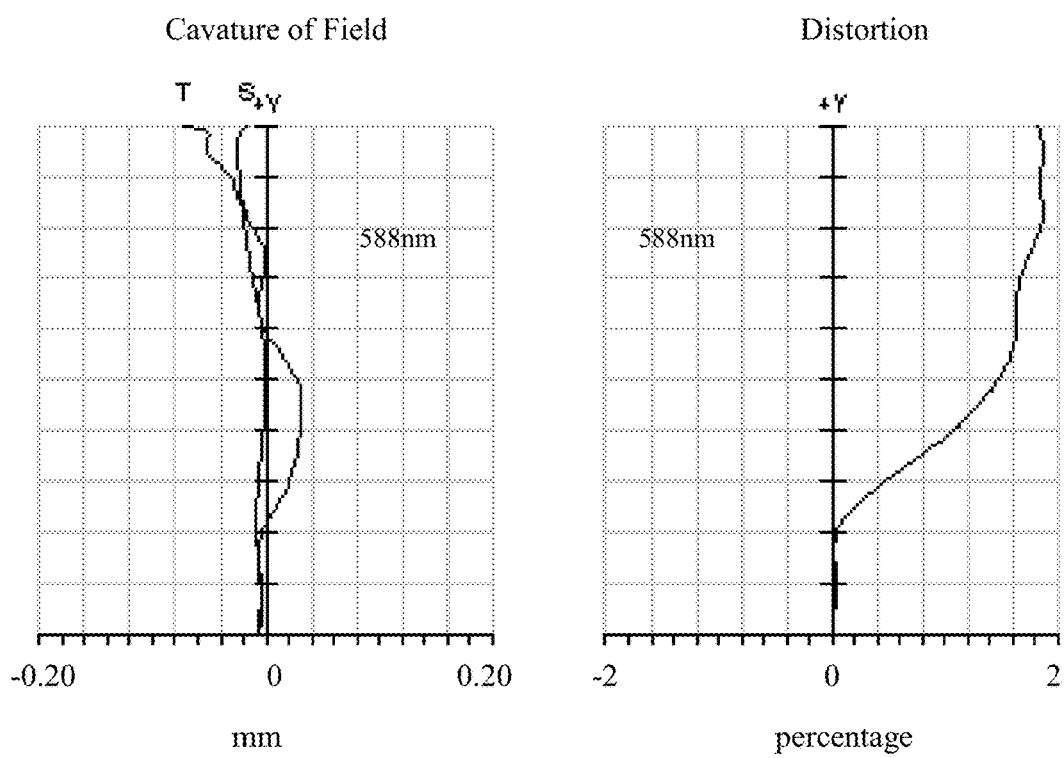
FIG. 13 is a diagram showing field curvature and distortion of the camera lens LA in the embodiment 3.

The axial aberration of the camera lens LA in embodiment 3 is shown in FIG. 11, the lateral color is shown in FIG. 12, and the field curvature and distortion is shown in FIG. 13. As shown in FIGS. 11 to 13, in embodiment 3, the camera lens LA meets $2\omega=88.0°$, TTL/IH=1.312, Fno=2.00, $2\omega \geq 85°$, and the camera lens is ultrathin with bright Fno. Accordingly, it is not difficult to understand that the camera lens LA in embodiment 3 has excellent optical characteristics.

TABLE 7

| | Embodiment 1 | Embodiment 2 | Embodiment 3 | Notes |
|---|---|---|---|---|
| v2-v3 | 36.709 | 36.709 | 36.709 | Formula (1) |
| v2-v4 | 30.032 | 30.032 | 31.981 | Formula (2) |
| v2-v5 | 31.981 | 31.981 | 33.475 | Formula (3) |
| f2/f4 | 1.821 | 1.848 | 1.863 | Formula (4) |
| d3/d1 | 0.637 | 0.648 | 0.645 | Formula (5) |
| R3/R4 | 3.180 | 3.180 | 3.075 | Formula (6) |
| R5/R6 | −1.200 | −2.550 | −1.850 | Formula (7) |
| Fno | 2.02 | 2.02 | 2.00 | |
| 2ω | 91.8 | 91.6 | 88.0 | |
| TTL/IH | 1.299 | 1.298 | 1.312 | |
| f | 3.204 | 3.200 | 3.247 | |
| f1 | 4.200 | 4.303 | 4.399 | |
| f2 | 4.537 | 4.673 | 4.781 | |
| f3 | −4.747 | −5.308 | −5.579 | |
| f4 | 2.492 | 2.529 | 2.566 | |
| f5 | −2.226 | −2.265 | −2.264 | |
| TTL | 4.204 | 4.201 | 4.247 | |
| LB | 1.036 | 1.049 | 1.071 | |
| IH | 3.238 | 3.238 | 3.238 | |

The protection scope of the present disclosure is not limited by the above-described embodiments. Any modification or variation to the content disclosed in the present disclosure made by skilled people in the existing technology shall be included in the protection scope disclosed by the Claims.

What is claimed is:

1. A camera lens, comprising in order from an object side: a first lens with positive refractive power, a second lens with positive refractive power, a third lens with negative refractive power, a fourth lens with positive refractive power and a fifth lens with negative refractive power, which meet the following conditional formulas:

$$28.00 \leq v2-v3 \leq 40.00 \tag{1}$$

$$28.00 \leq v2-v4 \leq 40.00 \tag{2}$$

$$28.00 \leq v2-v5 \leq 40.00 \tag{3}$$

$$1.80 \leq f2/f4 \leq 2.00 \tag{4}$$

$$0.63 \leq d3/d1 \leq 0.66 \tag{5}$$

Wherein,
v2: Abbe number of the second lens;
v3: Abbe number of the third lens;
v4: Abbe number of the fourth lens;
v5: Abbe number of the fifth lens;
f2: focal distance of the second lens;
f4: focal distance of the fourth lens;
d1: center thickness of the first lens;
d3: center thickness of the second lens.

2. The camera lens according to claim 1, wherein it meets the following conditional formula (6):

$$2.95 \leq R3/R4 \leq 3.20 \tag{6}$$

wherein,
R3: curvature radius of object side surface of the second lens;
R4: curvature radius of image side surface of the second lens.

3. The camera lens according to claim 1, wherein it meets the following conditional formula (7):

$$-2.70 \leq R5/R6 \leq -1.00 \tag{7}$$

wherein,
R5: curvature radius of object side surface of the third lens;
R6: curvature radius of image side surface of the third lens.

* * * * *